(12) United States Patent
Hu et al.

(10) Patent No.: US 9,900,192 B2
(45) Date of Patent: Feb. 20, 2018

(54) METHOD OF DEMODULATING A SIGNAL PACKET, A COMMUNICATION SYSTEM AND A LIGHTING DEVICE

(71) Applicant: RADIANT OPTO-ELECTRONICS CORPORATION, Kaohsiung (TW)

(72) Inventors: Wei-Wen Hu, Kaohsiung (TW); Jon-Hong Lin, Kaohsiung (TW); Chun-Yi Sun, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 15/252,665

(22) Filed: Aug. 31, 2016

(65) Prior Publication Data

US 2017/0063581 A1    Mar. 2, 2017

(30) Foreign Application Priority Data

Sep. 1, 2015 (TW) .............................. 104128832 A (51) Int. Cl.
*H04L 12/12* (2006.01)
*H04L 25/49* (2006.01)
*H04L 12/28* (2006.01)
*H05B 37/02* (2006.01)

(52) U.S. Cl.
CPC ...... *H04L 25/4902* (2013.01); *H04L 12/2816* (2013.01); *H05B 37/0263* (2013.01); *H04L 2012/2843* (2013.01)

(58) Field of Classification Search
CPC ............. H04L 25/4902; H04L 12/2816; H04L 12/2843; H05B 37/0263

USPC .................................. 375/259, 260, 295, 316
See application file for complete search history.

(56) References Cited

U.S. PATENT DOCUMENTS

| 7,340,156 B2 * | 3/2008 | Ishii ................. G11B 20/10527 369/275.3 |
| 7,551,237 B2 * | 6/2009 | Numata .................... H04N 5/60 348/632 |
| 9,097,032 B1 * | 8/2015 | Al-Saffar .............. E04H 1/1205 |
| 2004/0225811 A1 | 11/2004 | Fosler |

FOREIGN PATENT DOCUMENTS

| CN | 203301792 | 11/2013 |
| TW | M439317 | 10/2012 |
| WO | WO 2015/095921 | 7/2015 |

OTHER PUBLICATIONS

Taiwanese Search Report issued in Appln. No. 104128832 dated Aug. 9, 2016 (w/ translation).

* cited by examiner

*Primary Examiner* — Siu Lee
(74) *Attorney, Agent, or Firm* — Nixon & Vanderhye P.C.

(57) ABSTRACT

A method of demodulating a signal packet includes steps of: determining whether a pulse width of each of pulses of one of bits of the signal packet is associated with bit 0 or bit 1; updating first counting data associated with a number of the pulses that define bit 0, and determining whether the first counting data is greater than a first threshold value; deciding that said one of the bits of the signal packet is a bit 0; updating second counting data associated with a number of the pulses that define bit 1, and determining whether the second counting data is greater than the second threshold value; deciding that said one of the bits of the signal packet is a bit 1.

7 Claims, 10 Drawing Sheets

METHOD OF DEMODULATING A SIGNAL PACKET, A COMMUNICATION SYSTEM AND A LIGHTING DEVICE

CROSS-REFERENCE TO RELATED APPLICATION

This application claims priority of Taiwanese Application No. 104128832, filed on Sep. 1, 2015.

FIELD

The disclosure relates to a communication method, a communication system and a lighting device, more particularly to a method of demodulating a signal packet, a communication system and a lighting device.

BACKGROUND

With the advance of technology, monitoring and control of a lighting device have become an important issue. Conventional light control and management are merely associated with controlling on and off of a lighting device. Operational parameters, such as voltage, current, circuit quality and failure rate of circuits of each lighting device are not made available for monitoring in real time. In the past, a light control system is usually constructed in a wired manner, which costs significantly and is difficult in maintenance. Even if a light control signal is transmitted in a wireless manner, relay stations are required for long-distance transmission of the light control signal. In addition, since the radio spectrum resources are limited, it is difficult to monitor and control all street lights which are widely spread.

In order to overcome this issue, a technology of Power Line Communication (PLC) has been developed. Considering that almost each corner of a house or an office building is provided with an alternating current (AC) power socket, more complicated communication of a control signal, such as a signal to change a pattern or a color of light emitted by a lighting instrument, may be achieved without the need to construct a new transmission line.

A communication interface adopted in a current light control system is a Digital Addressable Lighting Interface (DALI) interface. However, the DALI interface requires additional installation of signal lines which incurs further cost and complexity in constructing the light control system. If a power line, instead of the signal lines, is used to transmit a digital control signal and electric power, a pulse period or a pulse width of the digital control signal may be influenced by noise in the power line so that the digital control signal may not be demodulated correctly.

SUMMARY

Therefore, an object of the disclosure is to provide a method of demodulating a signal packet, a communication system and a lighting device that can alleviate at least one of the drawbacks of the prior art.

According to a first aspect of the disclosure, the method of demodulating a signal packet is to be implemented by a controller. The signal packet includes a plurality of bits each of which is represented by a plurality of pulses. The controller stores in advance a first pulse width associated with the pulses of the signal packet that define bit 0, a first threshold value associated with bit 0, a second pulse width associated with the pulses of the signal packet that define bit 1, and a second threshold value associated with bit 1. The method includes steps of:

after receiving the signal packet, determining, by the controller, whether a pulse width of each of the pulses of one of the bits of the signal packet is associated with bit 0 or bit 1 according to the first pulse width and the second pulse width;

when it is determined by the controller that the pulse width is associated with bit 0, by the controller, updating first counting data associated with a number of the pulses that define bit 0, and determining whether the first counting data is greater than the first threshold value;

when it is determined by the controller that the first counting data is greater than the first threshold value, deciding, by the controller, that said one of the bits of the signal packet is a bit 0;

when it is determined by the controller that the pulse width is associated with bit 1, by the controller, updating second counting data associated with a number of the pulses that define bit 1, and determining whether the second counting data is greater than the second threshold value;

when it is determined by the controller that the second counting data is greater than the second threshold value, deciding, by the controller, that said one of the bits of the signal packet is a bit 1.

According to a second aspect of the disclosure, the communication system is configured for transmission of a light control signal. The system includes a control device and a lighting device. The control device is configured to transmit a command packet and receive a return packet. The command packet and the return packet serve as the light control signal. The lighting device includes a light control protocol interface and a first controller connected electrically to the light control protocol interface. The first controller is configured to receive the command packet, to correct the command packet thus received, and to transmit the command packet thus corrected to the light control protocol interface. The light control protocol interface is configured to transmit a return command which is associated with lighting condition of the lighting unit to the first controller.

The first controller includes a digital pulse output unit, a digital pulse control unit connected electrically to the digital pulse output unit, and a digital pulse demodulation unit receiving the command packet. The digital pulse output unit receives the return command and outputs a plurality of digital pulses. The digital pulse control unit generates the return packet according to the plurality of digital pulses and transmits the return packet to the control device. The digital pulse demodulation unit demodulates the command packet so as to correct the command packet and transmits the command packet thus corrected to the light control protocol interface.

According to a third aspect of the disclosure, the lighting device includes a light control protocol interface, a controller and a lighting unit. The controller is connected electrically to the light control protocol interface and includes a digital pulse demodulation unit. The digital pulse demodulation unit receives a command packet, demodulates the command packet so as to correct the command packet and transmits the command packet thus corrected to the light control protocol interface. The lighting unit is connected to the light control protocol unit and is controlled by the light control protocol interface according to the command packet thus corrected.

An effect of this disclosure resides in that by virtue of the error correction capability of the digital pulse demodulation unit, adverse influence on the pulse period or the pulse width resulting from noise or parameter deviation of circuit elements in the power line may be prevented.

BRIEF DESCRIPTION OF THE DRAWINGS

Other features and advantages of the disclosure will become apparent in the following detailed description of embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
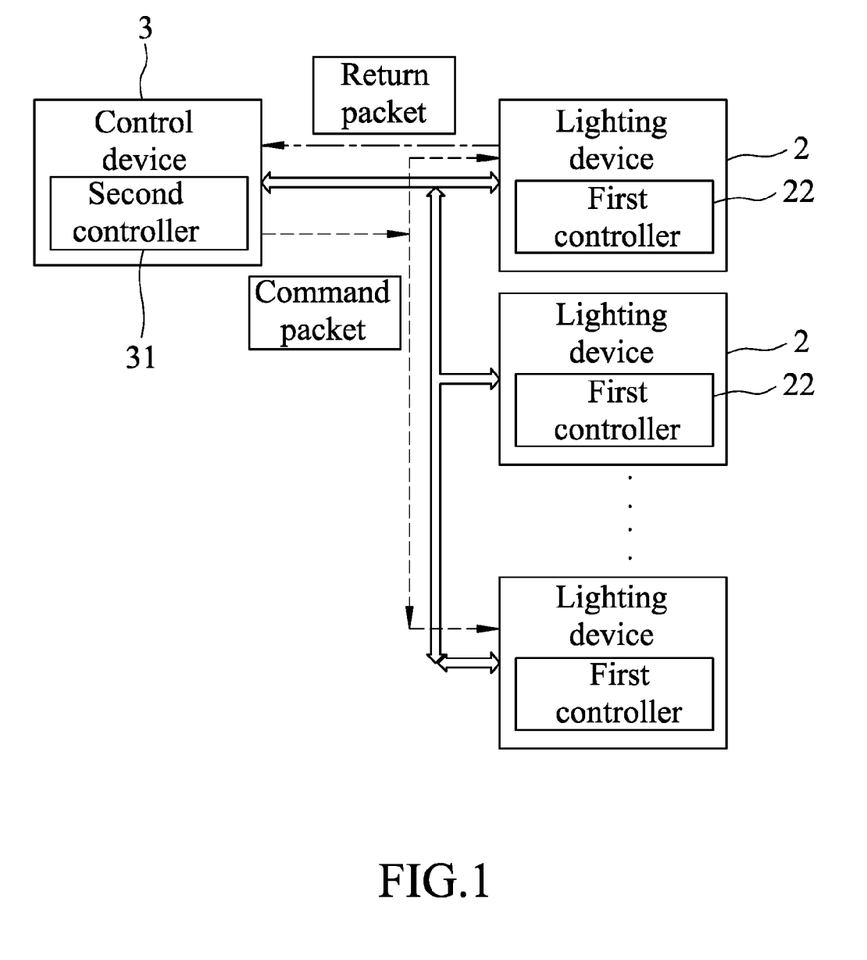
FIG. 1 is a block diagram illustrating an embodiment of a communication system for transmission of a light control signal according to the disclosure.

Referring to FIG. 1, a first embodiment of a method of demodulating a signal packet according to the disclosure is to be implemented by a communication system for transmission of a light control signal. The light control signal serves as the signal packet to be demodulated.

Figure 2:
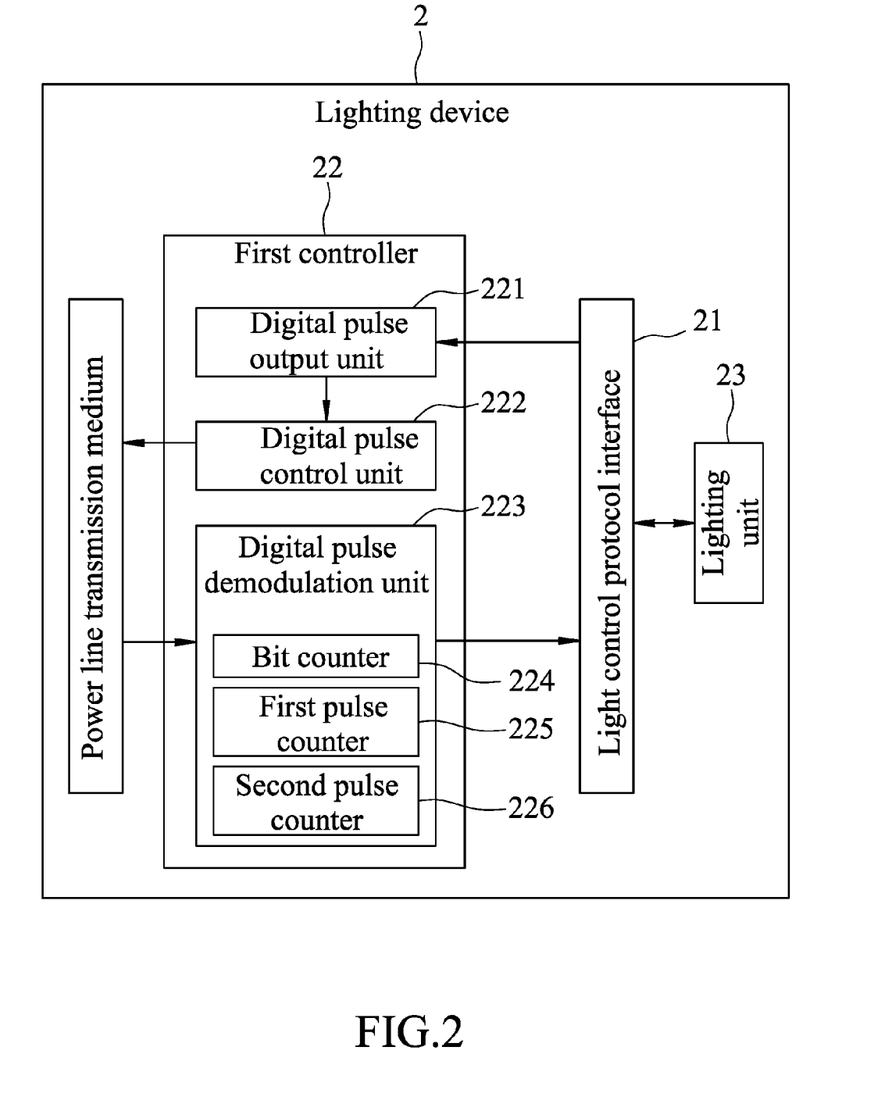
FIG. 2 is a block diagram illustrating an embodiment of a lighting device of the communication system.

Referring to FIGS. 1 and 2, the communication system for transmission of the light control signal includes at least one lighting device 2 and a control device 3. In the first embodiment, the at least one lighting device 2 and the control device 3 are connected in the manner of Digital Addressable Lighting Interface (DALI) buses. Multiple lighting devices 2 are illustrated in FIG. 1 for explanatory purposes.

Each of the lighting devices 2 includes a light control protocol interface 21, a first controller 22 connected electrically to the light control protocol interface 21, and a lighting unit 23 connected electrically to the light control protocol interface 21.

The light control protocol interface 21 transmits a return command, which is associated with lighting condition of the lighting unit 23 under control of the light control protocol interface 21, to the first controller 22. On the other hand, a command packet is corrected by the first controller 22 after receipt thereof, and is subsequently transmitted to the light control protocol interface 21. Specifically, the control device 3 combines information associated with the lighting unit 23 desired to be controlled and action desired to be performed by the lighting unit 23 to generate the command packet, also known as a forward frame. Distortion may be found in the command packet after the command packet is transmitted via a power line transmission medium. When each of the lighting devices 2 receives the command packet, the first controller 22 of the lighting device 2 is configured to correct the command packet if it is distorted. In the first embodiment, the light control protocol interface 21 is a DALI interface.

The first controller 22 includes a digital pulse output unit 221, a digital pulse control unit 222 connected electrically to the digital pulse output unit 221, and a digital pulse demodulation unit 223 receiving and demodulating the command packet. The digital pulse output unit 221 receives the return command and outputs a plurality of digital pulses according to the return command. The digital pulse control unit 222 generates a return packet according to the plurality of digital pulses and transmits the return packet to the control device 3. The return packet is also known as a backward frame. Information contained in the return packet includes the lighting condition of the lighting unit 23. The digital pulse demodulation unit 223 includes a bit counter 224 configured to count a number of bits of the command packet, a first pulse counter 225 configured to count a number of pulses which have pulse widths belonging to bit 0, and a second pulse counter 226 configured to count a number of pulses which have pulse widths belonging to bit 1. The digital pulse demodulation unit 223 is configured to determine whether a pulse contained in the command packet is the last pulse, and after determining whether a pulse width of each of pulses of one bit of the command packet belongs to bit 0 or bit 1, to determine whether a number of the pulses of the bit is greater than a threshold value. The digital pulse demodulation unit 223 demodulates the command packet so as to correct errors in the command packet, and transmits the command packet thus corrected to the light control protocol interface 21. In a condition that the command packet is a query packet, the light control protocol interface 21 transmits the return command to the digital pulse output unit 221.

The control device 3 includes a second controller 31 which transmits the command packet to at least one of the lighting devices 2, and demodulates the return packet received from the first controller 22 of one of the lighting devices 2 via the power line transmission medium. It should be noted that the second controller 31 includes components similar to those of the first controller 22. Since operations of the components of the second controller 31 upon receipt of the return packet are similar to the operations performed by the digital pulse output unit 221, the digital pulse control unit 222 and the digital pulse demodulation unit 223 of the first controller 22 upon receipt of the command packet, detailed descriptions of the same are omitted herein for the sake of brevity. The control device 3 further includes a light control protocol interface (not shown) similar to the light control protocol interface 21 of each of the lighting devices 2.

Figure 3:
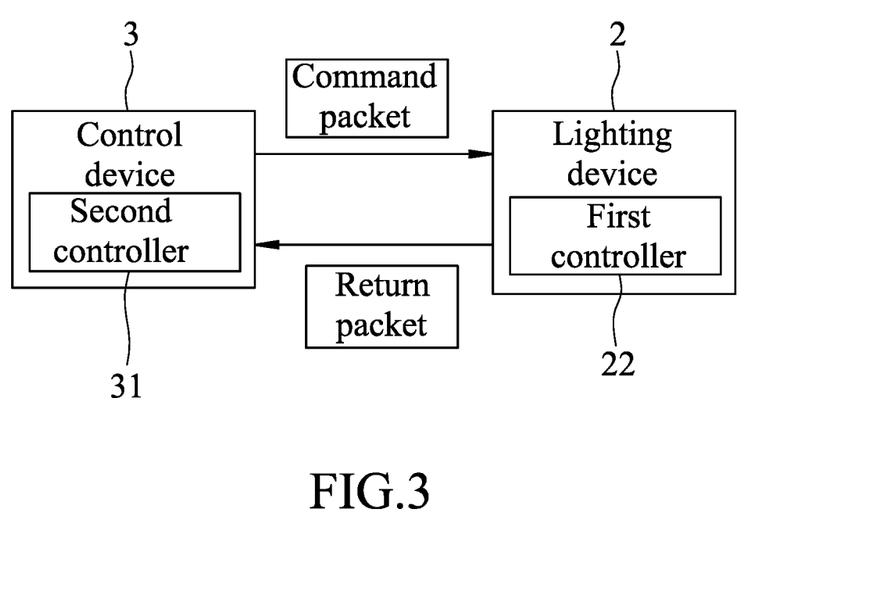
FIG. 3 is a block diagram illustrating an embodiment of transmission of a command packet and a return packet.
Figure 4:
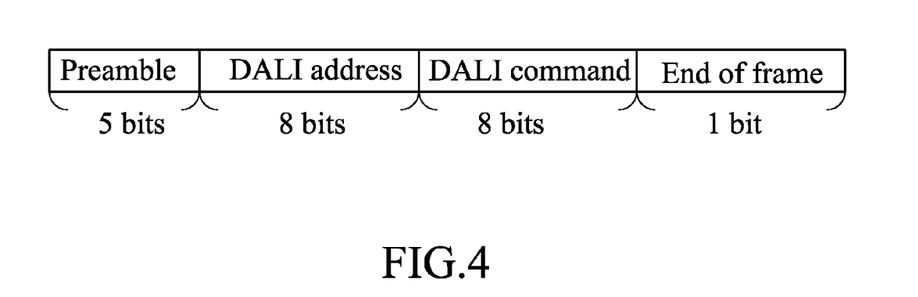
FIG. 4 is a schematic diagram illustrating an embodiment of the command packet.
Figure 5:
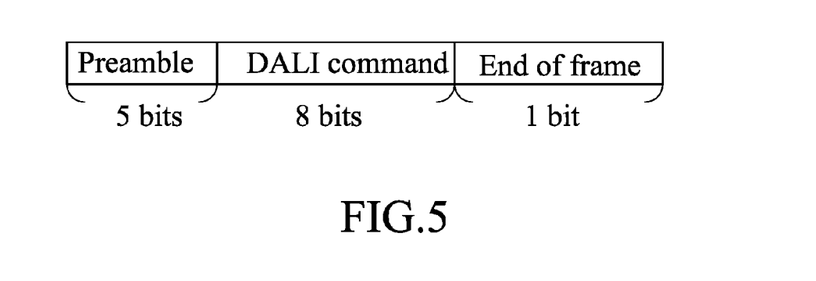
FIG. 5 is a schematic diagram illustrating an embodiment of the return packet.

Referring to FIGS. 2 and 3, both the return packet outputted by the first controller 22 of one of the lighting devices 2 and the command packet outputted by the second controller 31 of the control device 3 are transmitted via the power line transmission medium. Referring to FIG. 4, the command packet includes a preamble, a DALI address, a DALI command and an End Of Frame (EOF). Referring to FIG. 5, the return packet also includes a preamble, a DALI command and an End Of Frame (EOF). In other words, both the return packet and the command packet are provided with the preamble and the EOF. When one of the lighting devices 2 and the control device 3 receives the signal packet (i.e., the command packet or the return packet) transmitted via the power line transmission medium, a corresponding one of the first controller 22 of the lighting device 2 and the second controller 31 of the control device 3 corrects the signal packet, and transmits the signal packet thus corrected to the corresponding light control protocol interface. Subsequently, the light control protocol interface of each of the control device 3 and the lighting device 2 determines whether the signal packet is a return packet or a command packet based on the number of bits of the signal packet. When it is determined that the signal packet is a command packet, the DALI address and the DALI command of the command packet is obtained. When it is determined that the signal packet is a return packet, the DALI command of the return packet is obtained.

Figure 6:
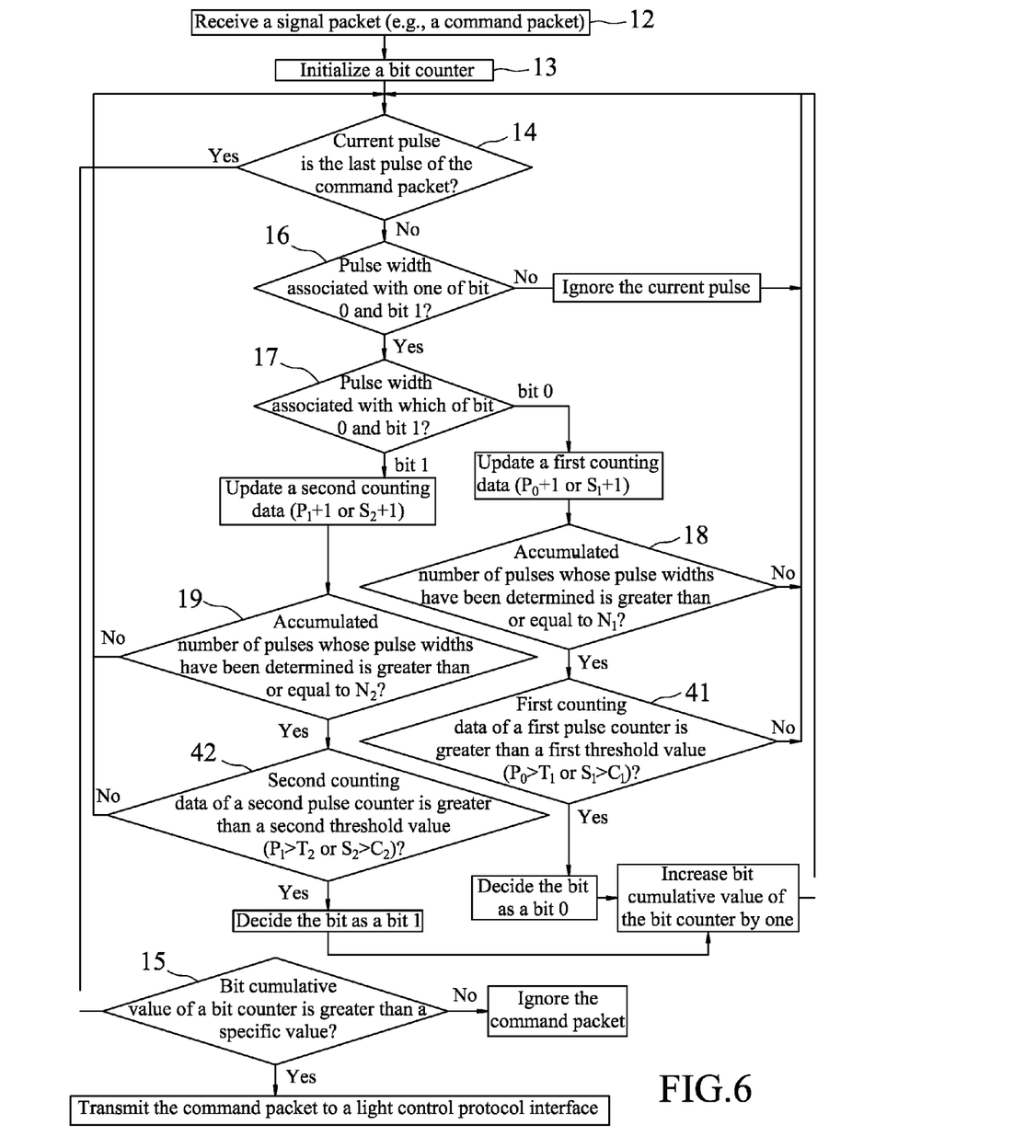
FIG. 6 is a flow chart illustrating a first embodiment of a method of demodulating a signal packet according to the disclosure.
Figure 7:
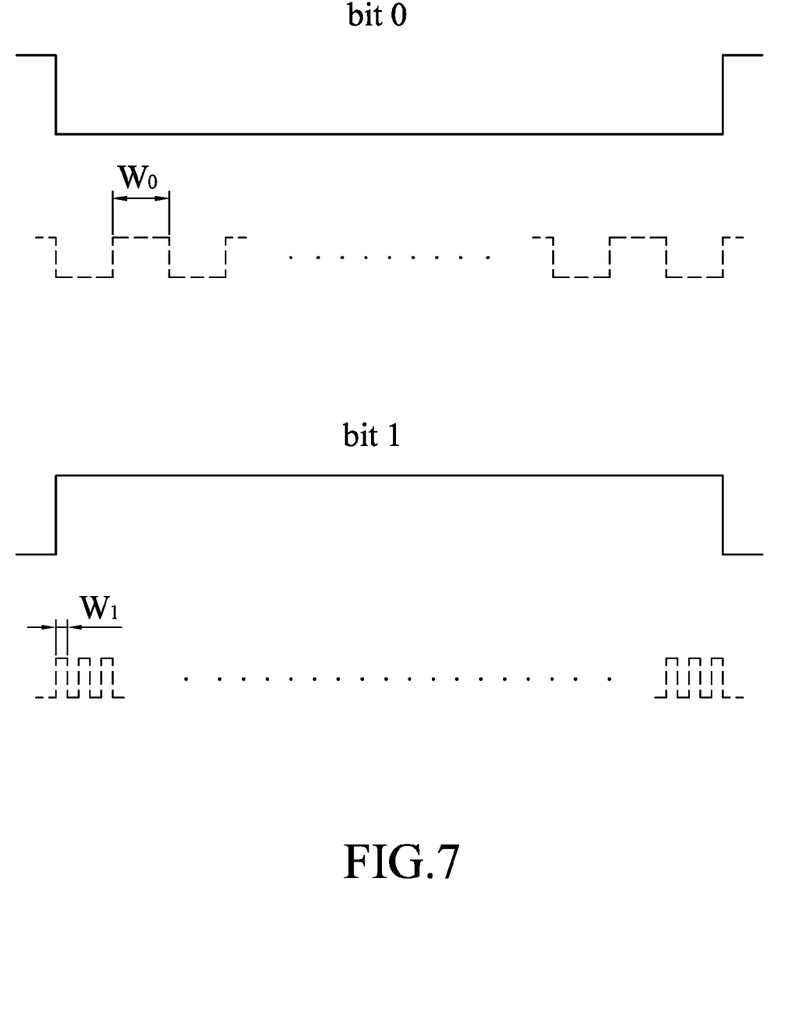
FIG. 7 is schematic diagram illustrating an embodiment of pulses with different pulse widths for representing bit 0 and bit 1 in a signal packet.

Referring to FIGS. 2, 6 and 7, the first embodiment of the method of demodulating a signal packet according to the disclosure includes a step 12 of receiving the signal packet, a step 13 of initializing the bit counter 224 to start counting, a step 14 of making a determination on a pulse, a step 15 of determining a value held by the bit counter 224, a step 16 of making a determination on a pulse width, a step 17 of determining the pulse width, a step 18 of determining an accumulated number of pulses, a step 19 of determining the accumulated number of pulses, a step 41 of determining a value held by the first pulse counter 225, and a step 42 of determining a value held by the second pulse counter 226.

In the first embodiment, Pulse Width Modulation (PWM) is adopted for generating the signal packet, the signal packet being either a command packet or a return packet. The signal packet includes a plurality of bits, each being a bit 1 or a bit 0. Each of the bits is represented by a plurality of pulses. A first pulse width $W_0$ associated with the pulses of the signal packet that define bit 0 is different from a second pulse width $W_1$ associated with the pulses of the signal packet that define bit 1 (see FIG. 7). In the first embodiment, the first pulse width $W_0$ associated with bit 0 is greater than the second pulse width $W_1$ associated with bit 1.

In step 12, a controller receives the signal packet. The controller is one of the first controller 22 and the second controller 31. In this embodiment, a scenario that the first controller 22 of one of the lighting devices 2 receives the command packet is given as an example herein for the sake of explanation. That is to say, the digital pulse demodulation unit 223 of the first controller 22 receives the command packet outputted by the second controller 31. In another scenario, it may be the second controller 31 that receives the return packet outputted by the first controller 22, and practice of this disclosure is not limited to the scenario discussed in the first embodiment herein.

In step 13, the digital pulse demodulation unit 223 initializes the bit counter 224, and the bit counter 224 is able to count a bit cumulative value which is associated with an accumulated number of the bits of the command packet that have been decided by the controller.

In step 14, the digital pulse demodulation unit 223 determines whether a pulse of the command packet is the last pulse of a last one of the bits of the command packet. When it is determined in step 14 that the pulse of the command packet is the last pulse of the last one of the bits of the command packet, step 15 is performed. Otherwise, when it is determined in step 14 that the pulse of the command packet is not the last pulse of the last one of the bits of the command packet, step 16 is performed.

In step 15, the digital pulse demodulation unit 223 makes a determination as to whether the bit cumulative value of the bit counter 224 is greater than a specific value. The specific value is associated with a number of bits of an effective signal packet. When a result of the determination made in step 15 is affirmative, it means that the command packet has been corrected, and the command packet is transmitted by the digital pulse demodulation unit 223 to the light control protocol interface 21. When the result of the determination made in step 15 is negative, it means that transmission failure of the command packet occurs and the command packet cannot be corrected, and the first controller 22 ignores the command packet. It should be noted that the specific value is decided according to a number of bits of the DALI address and the DALI command of the signal packet. In the first embodiment, the number of bits of the command packet is twenty two (see FIG. 4). The command packet includes the preamble represented by five bits, the DALI address represented by eight bits, the DALI command represented by eight bits, and the EOF represented by one bit. Since the total number of bits of the DALI address and the DALI command is sixteen, the specific value for the command packet is sixteen. On the other hand, for the return packet, the specific value is set to eight. In this embodiment, the DALI protocol is used for deciding the specific values. However, in another embodiment, if a different protocol is adopted, the specific values should be decided based on the number of bits confined by the different protocol, and are not limited to the disclosure of this embodiment.

In step 16, each of the bits includes a plurality of pulses having the same pulse width, and each of bit 0 and bit 1 is associated with a respective one of the first pulse width $W_0$ and the second pulse width $W_1$. The digital pulse demodulation unit 223 stores in advance the first pulse width $W_0$, a first threshold value associated with bit 0, the second pulse width $W_1$, and a second threshold value associated with bit 1. Therefore, in step 16, the digital pulse demodulation unit 223 makes a determination as to whether or not a pulse width of each of the pulses of one of the bits of the command packet is associated with one of bit 0 and the bit 1 according to the first pulse width $W_0$ and the second pulse width $W_1$. When a result of the determination made in step 16 is affirmative, step 17 is performed. Otherwise, when the result of the determination made in step 16 is negative, it means that the pulse is no contributory to demodulation of the command packet, the pulse is therefore ignored, and the flow goes back to step 14 for determination of the next pulse.

In step 17, the digital pulse demodulation unit 223 determines whether the pulse width of the pulse of said one of the bits of the command packet is associated with bit 0 or bit 1. When it is determined by the digital pulse demodulation unit 223 in step 17 that the pulse width of the pulse is associated with bit 0 (i.e., equal to the first pulse width $W_0$), the first pulse counter 225 updates first counting data associated with a number of the pulses that define bit 0. In the first embodiment, the first counting data includes a first cumulative value $P_0$ that is associated with an accumulated number of the pulses which have the pulse width associated with bit 0. In other words, the first pulse counter 225 increases the first cumulative value $P_0$ by one, and the flow proceeds to step 18. When it is determined by the digital pulse demodulation unit 223 that the pulse width is associated with bit 1 (i.e., equal to the second pulse width $W_1$), the second pulse counter 226 updates second counting data associated with a number of the pulses that define bit 1. In this embodiment, the second counting data includes a second cumulative value $P_1$ that is associated with an accumulated number of the pulses which have the pulse width associated with bit 1. In other words, the second pulse counter 226 increases the second cumulative value $P_1$ by one, and the flow proceeds to step 19.

In step 18, the digital pulse demodulation unit 223 makes a determination as to whether an accumulated number of the pulses of said one of the bits whose pulse widths have undergone the determination made in step 16 is greater than or equal to a first checkpoint value $N_1$. The first checkpoint value $N_1$ is a serial number of a specific one of those pulses that define bit 0. When a result of the determination made in step 18 is affirmative, step 41 is performed. Otherwise, when the result of the determination made in step 18 is negative, the flow goes back to step 14 for making a determination on the next pulse. It should be noted that the digital pulse demodulation unit 223 further includes a counter (not shown) for keeping the accumulated number of the pulses of said one of the bits whose pulse widths have undergone the determination made in step 16, and this counter is reset to zero once said one of the bits has been decided to be a bit 0 or a bit 1. Since the arrangement of the counter should be readily known to the skilled in the art, detailed descriptions of the same are omitted herein.

In step 41, the digital pulse demodulation unit 223 determines whether the first cumulative value $P_0$ of the first pulse counter 225 is greater than the first threshold value. In the first embodiment, the first threshold value includes a first pulse number $T_1$ that is associated with the number of the pulses defining bit 0. When it is determined in step 41 that the first cumulative value $P_0$ is greater than the first pulse number $T_1$, it means that the number of the pulses of said one of the bits whose pulse widths are associated with bit 0 has reached a criteria of judgment. Therefore, the digital pulse demodulation unit 223 decides that said one of the bits of the command packet is a bit 0, and resets the first cumulative value $P_0$ stored in the first pulse counter 225 to zero. In addition, the bit cumulative value of the bit counter 224 is increased by one, and the flow goes back to step 14 for making a determination on the next pulse. On the other hand, when it is determined in step 41 that the first cumulative value $P_0$ is not greater than the first pulse number $T_1$, the flow directly goes back to step 14.

In step 19, the digital pulse demodulation unit 223 makes a determination as to whether the accumulated number of the pulses of said one of the bits whose pulse widths have undergone the determination made in step 16 is greater than or equal to a second checkpoint value $N_2$. The second checkpoint value $N_2$ is a serial number of a specific one of the pulses that define bit 1. When a result of the determination made in step 19 is affirmative, step 42 is performed. Otherwise, when the result of the determination made in step 19 is negative, the flow goes back to step 14.

In step 42, the digital pulse demodulation unit 223 determines whether the second cumulative value $P_1$ of the second pulse counter 226 is greater than the second threshold value. In the first embodiment, the second threshold value includes a second pulse number $T_2$ that is associated with the number of the pulses defining bit 1. When it is determined in step 42 that the second cumulative value $P_1$ is greater than the second pulse number $T_2$, it means that the number of the pulses of said one of the bits whose pulse widths are associated with bit 1 has reached another criteria of judgment. Therefore, the digital pulse demodulation unit 223 decides that said one of the bits of the command packet is a bit 1, and resets the second cumulative value $P_1$ stored in the second pulse counter 226 to zero. In addition, the bit cumulative value of the bit counter 224 is increased by one, and the flow goes back to step 14 for making a determination on the next pulse. On the other hand, when it is determined in step 42 that the second cumulative value $P_1$ is not greater than the second pulse number $T_2$, the flow directly goes back to step 14.

Figure 8:
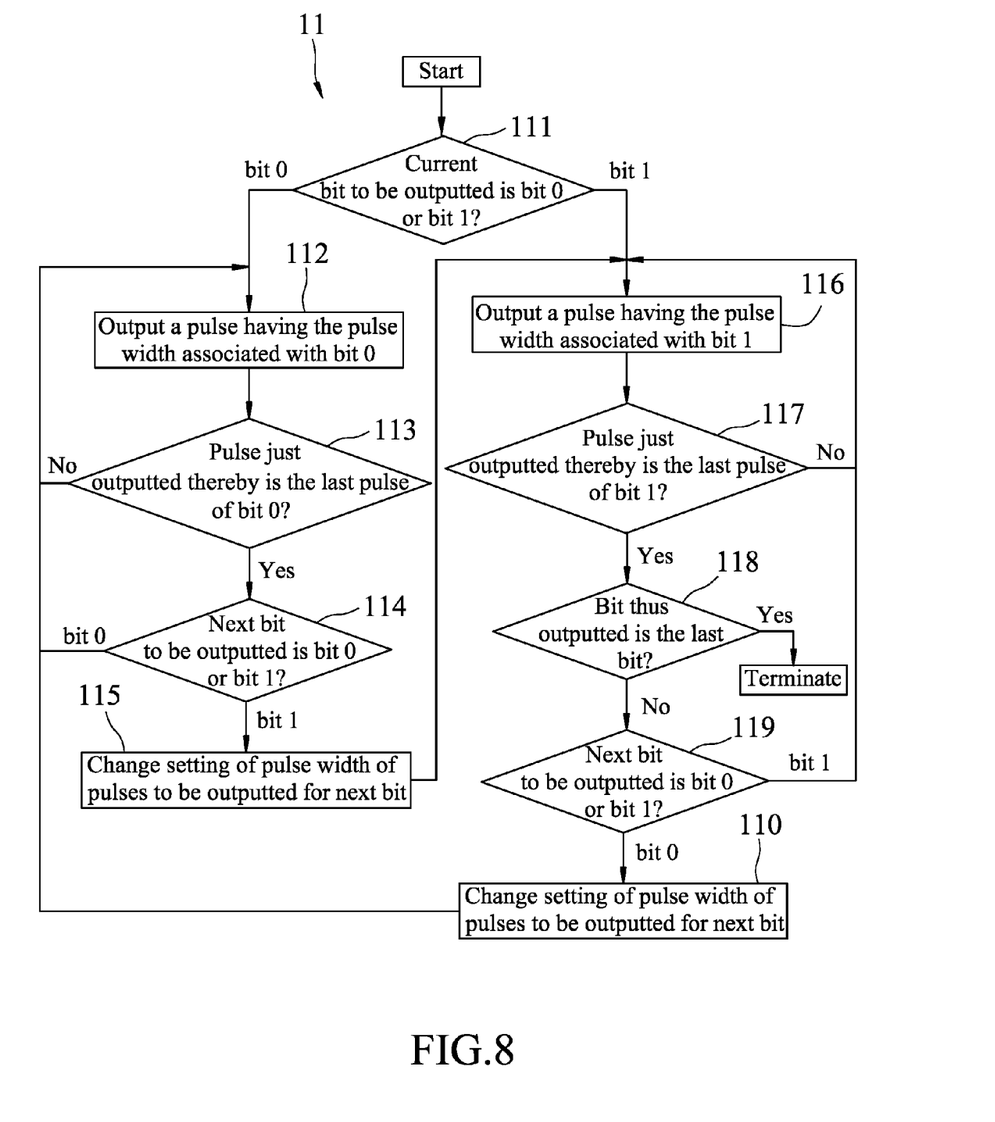
FIG. 8 is a flow chart illustrating an embodiment of sub-steps associated with outputting a command packet.

It should be supplemented that the first embodiment further includes a step 11 (see FIG. 8). In step 11, the digital pulse output unit 221 outputs a plurality of pulses, the digital pulse control unit 222 generates the return packet according to the plurality of digital pulses. In this embodiment, a scenario that the first controller 22 outputs the return packet is provided for explanation purposes. However, step 11 is also applicable to a scenario that the second controller 31 outputs the command packet. Therefore, the disclosure is not limited to the embodiment herein.

It should be further supplemented that the first pulse number $T_1$ and the second pulse number $T_2$ are decided based on the following approach. In the first embodiment, the bit rate of the signal packet is 5.8 kbps. Since the first pulse width $W_0$ associated with bit 0 is relatively large, the pulses defining bit 0 has a relatively slow pulse rate of 139.2 kpps (pulses per second). Since the second pulse width $W_1$ associated with bit 1 is relatively small, the pulses defining bit 1 has a relatively high pulse rate of 145 kpps. Therefore, the number of pulses used to represent bit 0 or bit 1 may be obtained by dividing the pulse rate by the bit rate. That is to say, the number of pulses used to represent bit 0 is twenty four (i.e., 139.2 k/5.8 k=24). Similarly, the number of pulses used to represent bit 1 is twenty five (i.e., 145 k/5.8 k=25). The first pulse number $T_1$ and the second pulse number $T_2$ are preferably set to be greater than half of the number of pulses used to represent bit 0 and bit 1, respectively. Accordingly, the first pulse number $T_1$ associated with bit 0 must be greater than 12, and the second pulse number $T_2$ associated with bit 1 must be greater than 12.5.

In addition, the aforementioned first checkpoint value $N_1$ and the second checkpoint value $N_2$ are set to be serial numbers of specific ones of the pulses that define bit 0 and bit 1, respectively. For example, for bit 0 defined by twenty four pulses, the first checkpoint value may be set to be 18, or the last serial number of the pulses, i.e., 24, depending on practical design needs. When the first checkpoint value $N_1$ or the second checkpoint value $N_2$ is smaller than half of the number of pulses defining the corresponding bit, the first pulse number $T_1$ or the second pulse number $T_2$ should also be adjusted to be smaller than half of the number of pulses defining the corresponding bit. Therefore, the disclosure is not limited to the requirements of the first embodiment. The requirements include that the first pulse number $T_1$ and the second pulse number $T_2$ must be greater than half of the number of pulses used to represent bit 0 and bit 1, respectively.

In a variation of the first embodiment, the first counting data includes a first consecutive value $S_1$ that is associated with a number of consecutive ones of the pulses which have pulse widths associated with bit 0, and the first threshold value includes a first setting value $C_1$ that is associated with the pulses defining bit 0. In step 41, the digital pulse demodulation unit 223 determines whether the first consecutive value $S_1$ is greater than the first setting value $C_1$. When it is determined in step 41 that the first consecutive value $S_1$ is greater than the first setting value $C_1$, it means that the number of the pulses of said one of the bits whose pulse widths are associated with bit 0 has reached a criteria of judgment, so that said one of the bits is decided as a bit 0.

Subsequently, the bit counter 224 increases the bit cumulative value by one, and the flow goes back to step 14 for making a determination on the next pulse. Otherwise, when it is determined in step 41 that the first consecutive value $S_1$ is not greater than the first setting value $C_1$, the flow directly goes back to step 14.

Similarly, in the variation of the first embodiment, the second counting data includes a second consecutive value $S_2$ that is associated with a number of consecutive ones of the pulses which have the pulse widths associated with bit 1, and the second threshold value includes a second setting value $C_2$ that is associated with the pulses defining bit 1. In step 42, the digital pulse demodulation unit 223 determines whether the second consecutive value $S_2$ is greater than the second setting value $C_2$. When it is determined in step 42 that the second consecutive value $S_2$ is greater than the second setting value $C_2$, it means that the number of the pulses of said one of the bits whose pulse widths are associated with bit 1 has reached another criteria of judgment, so that said one of the bits is decided as a bit 1. Subsequently, the bit counter 224 increases the bit cumulative value by one, and the flow goes back to step 14 for making a determination on the next pulse. Otherwise, when it is determined in step 42 that the second consecutive value $S_2$ is not greater than the second setting value $C_2$, the flow directly goes back to step 14.

Referring to FIGS. 2 and 8, step 11 includes a sub-step 111 of making a determination on a bit to be outputted, a sub-step 112 of outputting pulses, a sub-step 113 of making a determination on a pulse thus outputted, a sub-step 114 of making a determination on the next bit to be outputted, a sub-step 115 of changing the setting of a pulse width of pulses to be outputted, a sub-step 116 of outputting pulses, a sub-step 117 of making a determination on a pulse thus outputted, a sub-step 118 of making a determination on the bit thus outputted, a sub-step 119 of making a determination on the next bit to be outputted, and a sub-step 110 of changing the setting of a pulse width of pulses thus outputted.

In sub-step 111, the digital pulse control unit 222 determines whether a current bit to be outputted and associated with the plurality of digital pulses outputted by the digital pulse output unit 221 is bit 0 or a bit 1. When it is determined in sub-step 111 that the bit to be outputted is a bit 0, the flow proceeds to sub-step 112. When it is determined in sub-step 111 that the bit to be outputted is a bit 1, the flow proceeds to sub-step 116.

In sub-step 112, the digital pulse control unit 222 outputs a current pulse having the pulse width associated with bit 0.

In sub-step 113, the digital pulse control unit 222 makes a determination as to whether the pulse just outputted thereby is the last pulse of the bit (i.e., bit 0). When a result of the determination made in sub-step 113 is negative, the flow goes back to sub-step 112 for outputting a pulse next in sequence (i.e., a next pulse) for the current bit. Otherwise, when the result of the determination made in sub-step 113 is positive, the flow proceeds to sub-step 114.

In sub-step 114, the digital pulse control unit 222 determines whether the next bit to be outputted is a bit 0 or a bit 1. When it is determined in sub-step 114 that the next bit is a bit 0, the flow goes back to sub-step 112 for outputting a pulse of the next bit. When it is determined in sub-step 114 that the next bit is a bit 1, the flow proceeds to sub-step 115.

In sub-step 115, since the pulse width of the pulses defining bit 1 is different from that of the pulses defining bit 0, the digital pulse control unit 222 changes the setting of the pulse width of pulses to be outputted for the next bit that is a bit 1, for example, changing from the first pulse width $W_0$ to the second pulse width $W_1$, and the flow proceeds to sub-step 116.

In sub-step 116, the digital pulse control unit 222 outputs a pulse having the pulse width associated with bit 1.

In sub-step 117, the digital pulse control unit 222 makes a determination as to whether the pulse just outputted thereby is the last pulse of the bit (i.e., bit 1). When a result of the determination made in sub-step 117 is negative, the flow goes back to sub-step 116 for outputting the next pulse. Otherwise, when the result of the determination made in sub-step 117 is positive, the flow proceeds to sub-step 118.

In sub-step 118, the digital pulse control unit 222 makes a determination as to whether the bit thus outputted is the last bit. When a result of the determination made in sub-step 118 is affirmative, it means that the return packet has been outputted completely, and the digital pulse control unit 222 terminates the output process. Otherwise, when the result of the determination made in sub-step 118 is negative, the flow proceeds to sub-step 119.

In sub-step 119, the digital pulse control unit 222 determines whether the next bit to be outputted is a bit 0 or a bit 1. When it is determined in sub-step 119 that the next bit is a bit 1, the flow goes back to sub-step 116 for outputting the pulses of the next bit. When it is determined in sub-step 119 that the next bit is a bit 0, the flow proceeds to sub-step 110.

In sub-step 110, since the pulse width of the pulses defining a bit 0 is different from that of the pulses defining a bit 1, the digital pulse control unit 222 changes the setting on the pulse width of subsequent pulses to be outputted (for the next bit, which is a bit 0), and the flow proceeds to sub-step 112.

Figure 9:
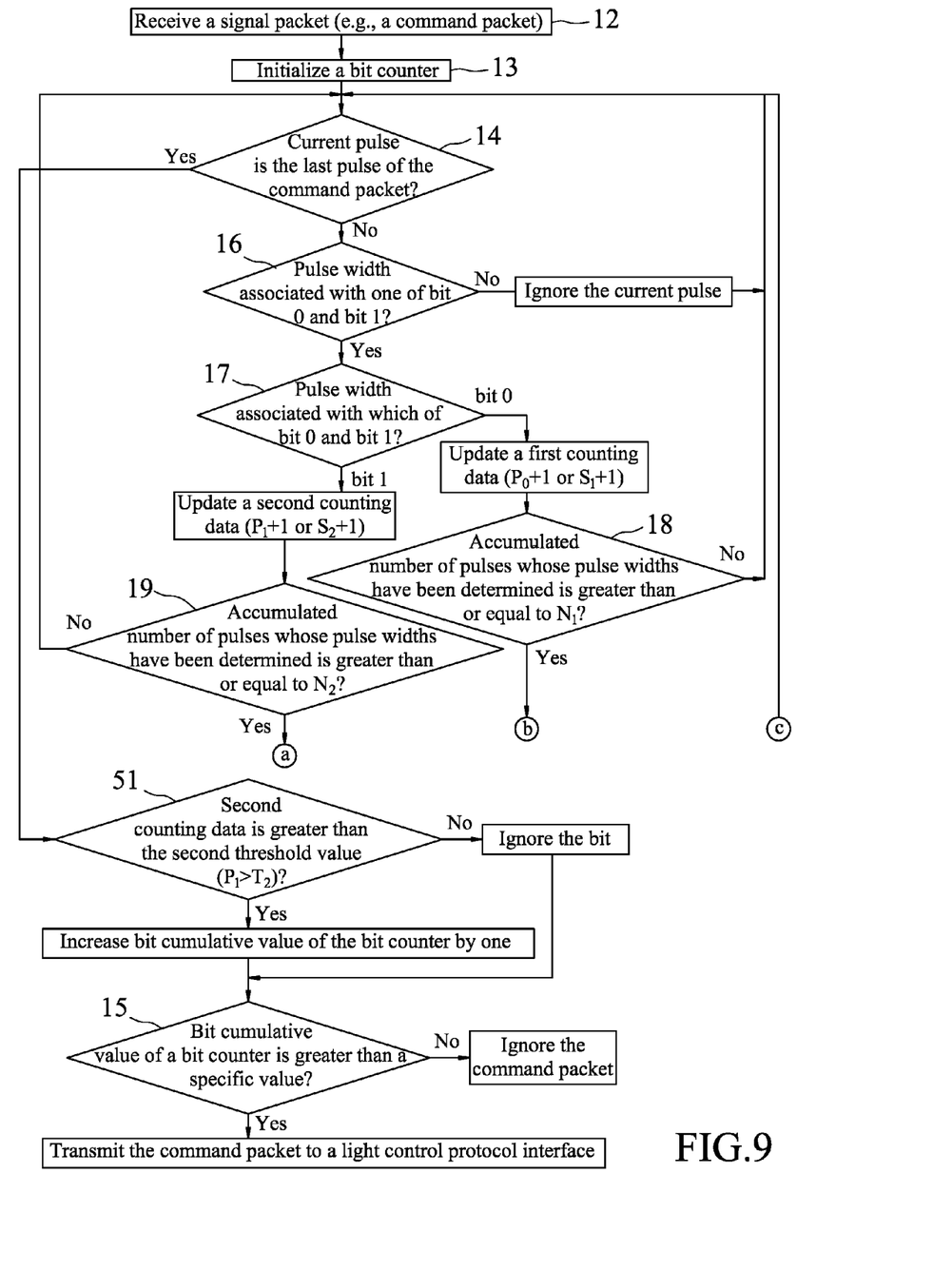
FIGS. 9 and 10 cooperate to show a flow chart of a second embodiment of the method of demodulating a signal packet according to the disclosure.
Figure 10:
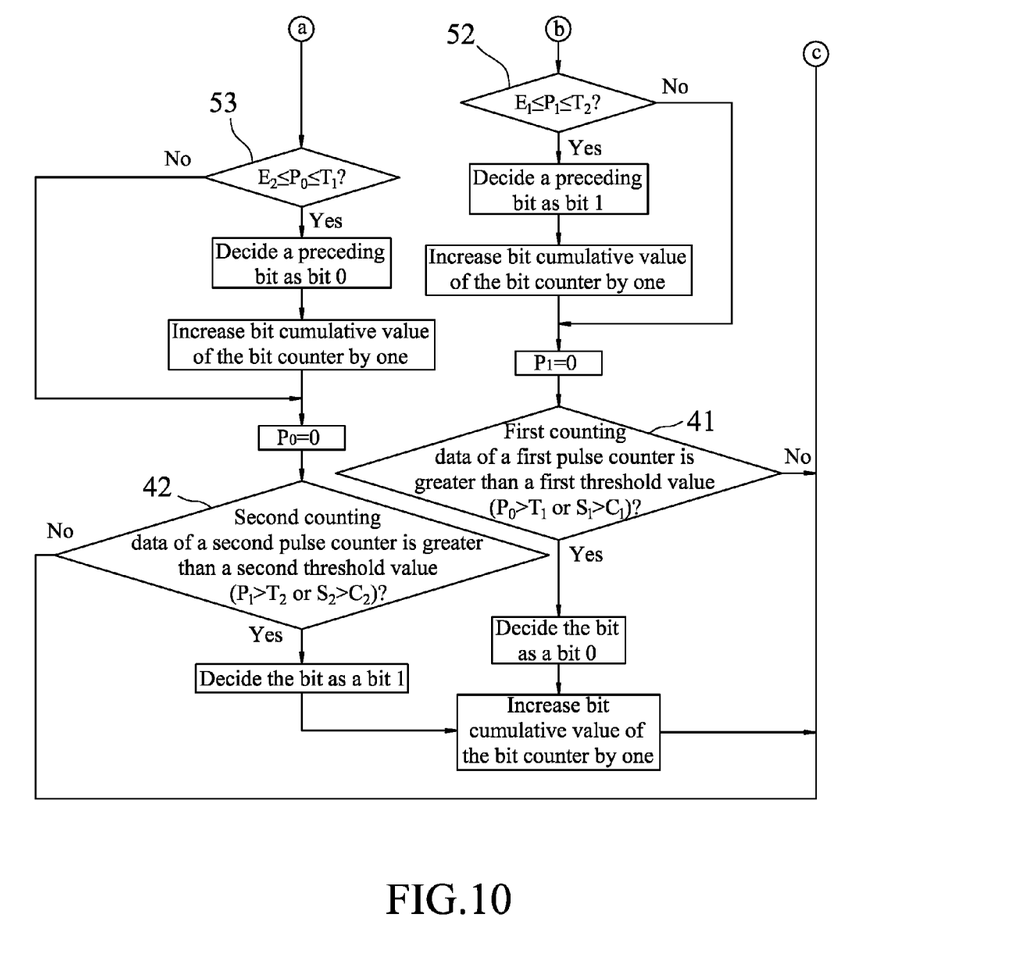

Referring to FIGS. 2, 9 and 10, a second embodiment of the method of demodulating a signal packet according to the disclosure is similar to the first embodiment, and is also to be implemented by the communication system used in the first embodiment for transmission of a light control signal. The second embodiment is different from the first embodiment in that a new step 51 of making a determination on the second counting data of the second pulse counter 226 is performed subsequent to step 14, a new step 52 of making a determination on the second counting data of the second pulse counter 226 is performed subsequent to step 18 and prior to step 41, and a new step 53 of making a determination on the first counting data of the first pulse counter 225 is performed subsequent to step 19 and prior to step 42.

When it is determined in step 14 that the pulse of the command packet is not the last pulse of the last one of the bits of the command packet, step 16 is performed. Otherwise, when it is determined in step 14 that the pulse of the command packet is the last pulse of the last one of the bits of the command packet, step 51 is performed.

In step 51, the digital pulse demodulation unit 223 determines whether the second cumulative value $P_1$ that is associated with an accumulated number of the pulses which have the pulse width belonging to the bit 1 is greater than the second pulse number $T_2$. When it is determined in step 51 that the second cumulative value $P_1$ is greater than the second pulse number $T_2$, the last one of the bits is decided as a bit 1, the bit cumulative value of the bit counter 224 is increased by one, and step 15 is performed. Otherwise, when it is determined in step 51 that the second cumulative value $P_1$ is not greater than the second pulse number $T_2$, the bit to which the last pulse belongs is ignored, and the flow directly proceeds to step 15.

Bit 0 is given as an example for explanatory purposes hereinafter. When a result of the determination made in step 18 is affirmative, i.e., the accumulated number of the pulses of said one of the bits whose pulse widths have undergone the determination made in step 16 is greater than or equal to the first checkpoint value $N_1$, the flow proceeds to step 52.

In step 52, the digital pulse demodulation unit 223 makes a determination as to whether or not the second cumulative value $P_1$ of the second pulse counter 226 is greater than or equal to a predetermined first base number $E_1$ and is smaller than or equal to the second pulse number $T_2$, that is $E_1 \leq P_1 \leq T_2$. When a result of the determination made in step 52 is affirmative, the digital pulse demodulation unit 223 decides that a preceding bit of said one of the bits of the command packet is a bit 1. The bit counter 224 increases the bit cumulative value by one, and the second pulse counter 226 clears the second cumulative value $P_1$ stored therein. The flow subsequently proceeds to step 41 for determining whether the first cumulative value $P_0$ of the first pulse counter 225 is greater than the first pulse number $T_1$. When it is determined in step 41 that the first cumulative value $P_0$ is not greater than the first pulse number $T_1$ (i.e., $P_0 \leq T_1$), the flow directly goes back to step 14 for making a determination on the next pulse. When it is determined in step 41 that the first cumulative value $P_0$ is greater than the first pulse number $T_1$ (i.e., $P_0 > T_1$), it means that the number of the pulses of said one of the bits whose pulse widths are associated with bit 0 has reached the criteria of judgment. Therefore, the digital pulse demodulation unit 223 decides that said one of the bits of the command packet is a bit 0, and resets the first cumulative value $P_0$ stored in the first pulse counter 225 to zero. In addition, the bit cumulative value of the bit counter 224 is increased by one, and the flow goes back to step 14 for making a determination on the next pulse.

When the result of the determination made in step 52 is negative, the second pulse counter 226 clears the second cumulative value $P_1$ stored therein, and the flow proceeds to step 41 for determining whether the first cumulative value $P_0$ is greater than the first pulse number $T_1$, so as to decide whether said one of the bit is a bit 0.

On the contrary, bit 1 is given as an example for explanatory purposes hereinafter. When the result of the determination made in step 19 is affirmative, i.e., the accumulated number of the pulses of said one of the bits whose pulse widths have undergone the determination made in step 16 is greater than or equal to the second checkpoint value $N_2$, the flow proceeds to step 53.

In step 53, the digital pulse demodulation unit 223 makes a determination as to whether or not the first cumulative value $P_0$ of the first pulse counter 225 is greater than or equal to a predetermined second base number $E_2$ and is smaller than or equal to the first pulse number $T_1$, that is $E_2 \leq P_0 \leq T_1$. When a result of the determination made in step 53 is affirmative, the digital pulse demodulation unit 223 decides that a preceding bit of said one of the bits of the command packet is a bit 0. The bit counter 224 increases the bit cumulative value by one, and the first pulse counter 225 clears the first cumulative value $P_0$ stored therein. The flow subsequently proceeds to step 42 for determining whether the second cumulative value $P_1$ of the second pulse counter 226 is greater than the second pulse number $T_2$. When it is determined in step 42 that the second cumulative value $P_1$ is not greater than the second pulse number $T_2$ (i.e., $P_1 \leq T_2$), the flow directly goes back to step 14 for making a determination on the next pulse. When it is determined in step 42 that the second cumulative value $P_1$ is greater than the second pulse number $T_2$ (i.e., $P_1 \geq T_2$), it means that the number of the pulses of said one of the bits whose pulse widths are associated with bit 1 has reached the criteria of judgment. Therefore, the digital pulse demodulation unit 223 decides that said one of the bits of the command packet is a bit 1, and resets the second cumulative value $P_1$ stored in the second pulse counter 225 to zero. In addition, the bit cumulative value of the bit counter 224 is increased by one, and the flow goes back to step 14 for making a determination on the next pulse.

When the result of the determination made in step 53 is negative, the first pulse counter 225 clears the first cumulative value $P_0$ stored therein, and the flow proceeds to step 42 for determining whether the second cumulative value $P_1$ is greater than the second pulse number $T_2$, so as to decide whether said one of the bit is a bit 1.

Referring to FIGS. 2, 9, 10 and 11, four scenarios are provided hereinafter for explaining the second embodiment of the disclosure.

Figure 11:
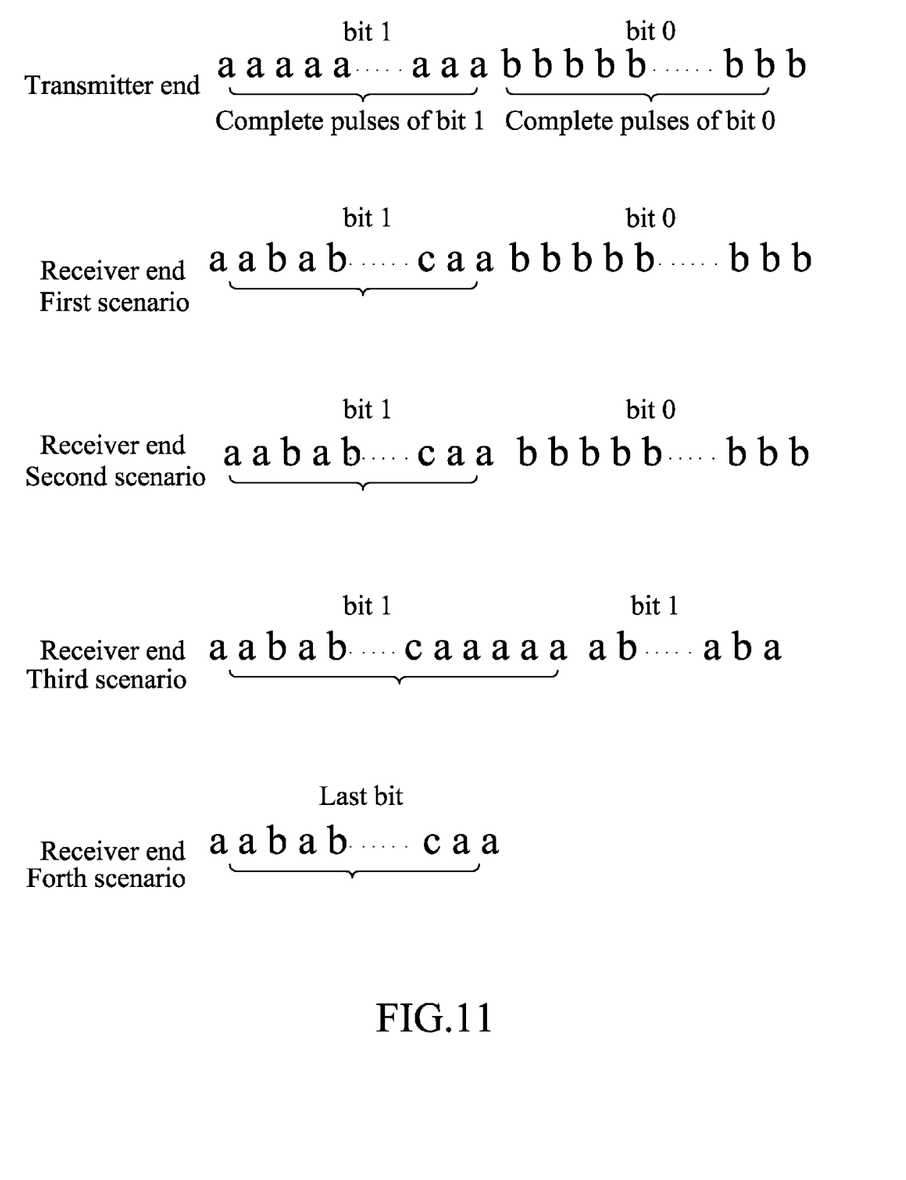
FIG. 11 is a schematic diagram illustrating four scenarios that distortions occurs in the signal packet.

In the first scenario, when it is determined in step 42 that the second cumulative value $P_1$ of the second pulse counter 226 is not greater than the second pulse number $T_2$, the flow directly goes back to step 14 for making a determination on the next pulse. After the pulse width of the pulse of said one of the bits of the command packet is determined to be associated with bit 0 in step 17, i.e., a change of pulse width occurs, subsequent to step 18, the flow proceeds to step 52 for making the determination as to whether or not the second cumulative value $P_1$ of the second pulse counter 226 is greater than or equal to the predetermined first base number $E_1$ and is smaller than or equal to the second pulse number $T_2$, that is $E_1 \leq P_1 \leq T_2$. When the result of the determination made in step 52 is affirmative, the digital pulse demodulation unit 223 decides that a preceding bit of said one of the bits of the command packet is a bit 1. The bit counter 224 increases the bit cumulative value by one, and the second pulse counter 226 clears the second cumulative value $P_1$ stored therein. When the result of the determination made in step 52 is negative, the second pulse counter 226 clears the second cumulative value $P_1$ stored therein. Regardless of whether the result of the determination made in step 52 is positive or negative, the flow eventually proceeds to step 41 for determining whether the first cumulative value $P_0$ of the first pulse counter 225 is greater than the first pulse number $T_1$, so as to decide whether said one of the bit is a bit 0.

Moreover, in this embodiment, whether said one of the bits of the command packet is a bit 0 is determined based on the determination associated with the first checkpoint value $N_1$ of step 18 and based on whether the first cumulative value $P_0$ is greater than the first pulse number $T_1$ of step 41. In a variation of this embodiment, whether said one of the bits of the command packet is a bit 0 may also be determined based on the determination associated with the first checkpoint value $N_1$ and based on whether the first consecutive value $S_1$ that is associated with a number of consecutive ones of the pulses which have the pulse widths that are associated with bit 0 is greater than the first setting value $C_1$. For example, if four consecutive pulses having pulse widths associated with bit 0 are received, there is a great chance that said one of the bits of the command packet is a bit 0. Depending on the fault tolerant capability of the communication system, the first setting value $C_1$ may be adjusted to serve as a different threshold for the first consecutive value $S_1$, and is thus not limited to the disclosure herein.

In the second scenario, when it is determined in step 42 that the second cumulative value $P_1$ of the second pulse counter 226 is greater than the second pulse number $T_2$, that is $T_2 < P_1$, said one of the bits of the command packet is determined as a bit 1, and the bit cumulative value of the bit counter 224 is increased by one.

Similarly, in this embodiment, whether said one of the bits of the command packet is a bit 1 is determined based on the determination associated with the second checkpoint value $N_2$ of step 19 and based on whether the second cumulative value $P_1$ is greater than the second pulse number $T_2$ of step 42. In a variation of this embodiment, whether said one of the bits of the command packet is a bit 1 may also be determined based on the determination associated with the second checkpoint value $N_2$ and based on whether the second consecutive value $S_2$ that is associated with a number of consecutive ones of the pulses which have the pulse widths associated with bit 1 is greater than the second setting value $C_2$. For example, if four consecutive pulses having pulse widths associated with bit 1 are received, there is a great chance that said one of the bits of the command packet is a bit 1. Depending on the fault tolerant capability of the communication system, the second setting value $C_2$ may be adjusted to serve as a different threshold for the second consecutive value $S_2$, and is thus not limited to the disclosure herein.

In the third scenario, when it is determined in step 42 that the second cumulative value $P_1$ of the second pulse counter 226 is not greater than the second pulse number $T_2$, that is $P_1 \leq T_2$, the flow goes back to step 14 for making a determination on the next pulse. In such precondition, the flow proceeds to step 16 and step 17 for determining whether a pulse width of the next pulse is associated with bit 0 or bit 1. When the pulse width is determined as being associated with bit 1 in step 17, step 42 will be performed. When it is determined in step 42 that the second cumulative value $P_1$ of the second pulse counter 226 is greater than the second pulse number $T_2$, that is $T_2 < P_1$, said one of the bits of the command packet is determined as the bit 1, and the bit cumulative value of the bit counter 224 is increased by one.

In the fourth scenario, when it is determined in step 14 that the pulse of the command packet is the last pulse of a last one of the bits of the command packet, step 51 is performed for determining whether the second cumulative value $P_1$ of the second pulse counter 226 is greater than the second pulse number $T_2$. This is because, for both of the command packet in FIG. 4 and the return packet in FIG. 5, the last bit which serves as the EOF should be a bit 1 to represent the end of the packet. In this way, step 51 is performed to determine whether an accumulated number of the pulses of the last bit of the signal packet which have the pulse width associated with bit 1 (i.e., the second cumulative value $P_1$ of the second pulse counter 226) is greater than the second pulse number $T_2$. When a result of the determination made in step 51 is affirmative, the last bit is a bit 1, and the bit cumulative value of the bit counter 224 is increased by one. When the result of the determination made in step 51 is negative, the bit to which the last pulse belongs is ignored, and the flow proceeds to step 15 for determining whether the bit cumulative value of the bit counter 224 is greater than the specific value, so as to determine whether the signal packet is completely received for subsequent transmission to the light control protocol interface.

For the first scenario, after the determinations on all pulses of one of the bits are finished, and the first cumulative value $P_0$ and the second cumulative value $P_1$ are not greater than the first pulse number $T_1$ and the second pulse number $T_2$, respectively, the digital pulse demodulation unit 223 takes a next bit as reference in deciding said one of the bits. For example, bit 1 is represented by six pulses each having a pulse width of 5 µm, and bit 0 is represented by four pulses each having a pulse width of 8 µm. When a return packet contains information of three bits of "101", the pulses of the return packet having pulse widths represented in numerals would be (555555 8888 555555). Due to the influence of noise and parameter deviation of circuit elements in the power line transmission medium, the pulses of the return packet received at the second controller 31 of the control device 3 may be (556541 8887 455555). When the second pulse number $T_2$ is set at three, after undergoing the steps shown in FIGS. 9 and 10, the second cumulative value $P_1$ that is associated with an accumulated number of the pulses which have the pulse width of 5 µm associated with the first bit 1 is three, which is not greater than the second pulse number $T_2$. Accordingly, the digital pulse demodulation unit 223 takes the next bit (i.e., bit 0) for reference. When the result of the determination associated with the first checkpoint value $N_1$ in step 18 is affirmative, in step 52, the digital pulse demodulation unit 223 makes the determination as to whether or not the second cumulative value $P_1$ of the second pulse counter 226 is greater than or equal to the predetermined first base number $E_1$ and is smaller than or equal to the second pulse number $T_2$. In this way, the first bit of the return packet may be decided as a bit 1, and in the subsequent step 41, the next bit is decided as a bit 0. In a similar manner, the information of "101" contained in the return packet thus demodulated and corrected may be obtained.

To sum up, in the method of demodulating a signal packet according to the disclosure, when the digital pulse demodulation unit 223 is demodulating the signal packet, distortions associated with the pulses of the bits of the signal packet may be corrected by virtue of steps 16-19, 41 and 42. In step 17, the determination as to whether the pulse width of each of the pulses of one of the bits of the signal packet is associated with bit 0 or bit 1 is made. In step 18, the determination as to whether the accumulated number of the pulses of said one of the bits whose pulse widths have undergone the determination made in step 16 is greater than or equal to the first checkpoint value $N_1$ is made. When it is determined in step 41 that the number of the pulses of said one of the bits whose pulse widths associated with bit 0 (i.e., the first cumulative value $P_0$) has reached the criteria of judgment according to the first pulse number $T_1$, said one of the bits is decided as a bit 0. On the other hand, in step 19, the determination as to whether the accumulated number of the pulses of said one of the bits whose pulse widths have undergone the determination made in step 16 is greater than or equal to the second checkpoint value $N_2$ is made. When it is determined in step 42 that the number of the pulses of said one of the bits whose pulse widths associated with bit 1 (i.e., the second cumulative value $P_1$) has reached the criteria of judgment according to the second pulse number $T_2$, said one of the bits is decided as a bit 1. When decision of said one of the bits to be a bit 0 or a bit 1 cannot be made because the first cumulative value $P_0$ or the second cumulative value $P_1$ is not greater than the first pulse number $T_1$ or the second pulse number $T_2$, a next one of the bits may be used to make the decision. For example, in a situation that a bit level is switched from bit 1 to bit 0, when determination on the first bit at a receiver end turns out to be indecisive, the next bit represented by pulses with a pulse width different from that of the pulses representing the first bit is to be decided, and the first bit may be decided during the process of deciding the next bit. If a distortion occurs at the second bit, the third bit is used for deciding the second bit, and so forth. In another situation of consecutive bits 0 or consecutive bits 1, pulses of the next bit may be used for deciding a current bit.

Therefore, by virtue of the error correction capability of the digital pulse demodulation unit 223, adverse influence on the pulse period or the pulse width resulting from noise or parameter deviation of circuit elements in the power line may be prevented.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A communication system for transmission of a light control signal, the system comprising:
   a control device which is configured to transmit a command packet and receive a return packet, the command packet and the return packet serving as the light control signal; and
   a lighting device which includes a light control protocol interface and a first controller connected electrically to said light control protocol interface, said first controller being configured to receive the command packet, to correct the command packet thus received, and to transmit the command packet thus corrected to said light control protocol interface, said light control protocol interface being configured to transmit a return command which is associated with lighting condition of a lighting unit to said first controller;
   wherein said first controller includes a digital pulse output unit, a digital pulse control unit connected electrically to said digital pulse output unit, and a digital pulse demodulation unit receiving the command packet;
   wherein said digital pulse output unit receives the return command and outputs a plurality of digital pulses, said digital pulse control unit generates the return packet according to the plurality of digital pulses and transmits the return packet to said control device, and said digital pulse demodulation unit demodulates the command packet so as to correct the command packet and transmits the command packet thus corrected to said light control protocol interface.

2. The communication system as claimed in claim 1, wherein said digital pulse demodulation unit includes a bit counter configured to count a number of bits of the command packet.

3. The communication system as claimed in claim 1, wherein said digital pulse demodulation unit includes a pulse counter configured to count a number of pulses of one bit of the command packet.

4. The communication system as claimed in claim 1, wherein said lighting device further includes the lighting unit connected electrically to said light control protocol interface and being controlled by said light control protocol interface according to the command packet thus corrected.

5. The communication system as claimed in claim 1, wherein said control device includes a second controller which transmits the command packet to said lighting device, and demodulates the return packet received from said first controller.

6. A lighting device comprising:
   a light control protocol interface;
   a controller connected electrically to said light control protocol interface and including a digital pulse demodulation unit, said digital pulse demodulation unit receiving a command packet, demodulating the command packet so as to correct the command packet and transmitting the command packet thus corrected to said light control protocol interface; and
   a lighting unit connected to said light control protocol interface and controlled by said light control protocol interface according to the command packet thus corrected.

7. The lighting device as claimed in claim 6,
   wherein said light control protocol interface is configured to generate a return command which is associated with lighting condition of said lighting unit; and
   wherein said controller further includes a digital pulse output unit and a digital pulse control unit connected electrically to said digital pulse output unit, said digital pulse output unit receiving the return command that is generated by said light control protocol interface, and outputting a plurality of digital pulses, said digital pulse control unit generating a return packet according to the plurality of digital pulses and outputting the return packet.

* * * * *